Oct. 17, 1933.                C. A. BICKEL                1,931,157
                             MACHINE TOOL
                       Filed March 18, 1932        5 Sheets-Sheet 1

INVENTOR
CLIFFORD A. BICKEL,
BY
ATTORNEYS

Oct. 17, 1933.    C. A. BICKEL    1,931,157
MACHINE TOOL
Filed March 18, 1932    5 Sheets-Sheet 3

INVENTOR
CLIFFORD A. BICKEL,
BY
ATTORNEYS

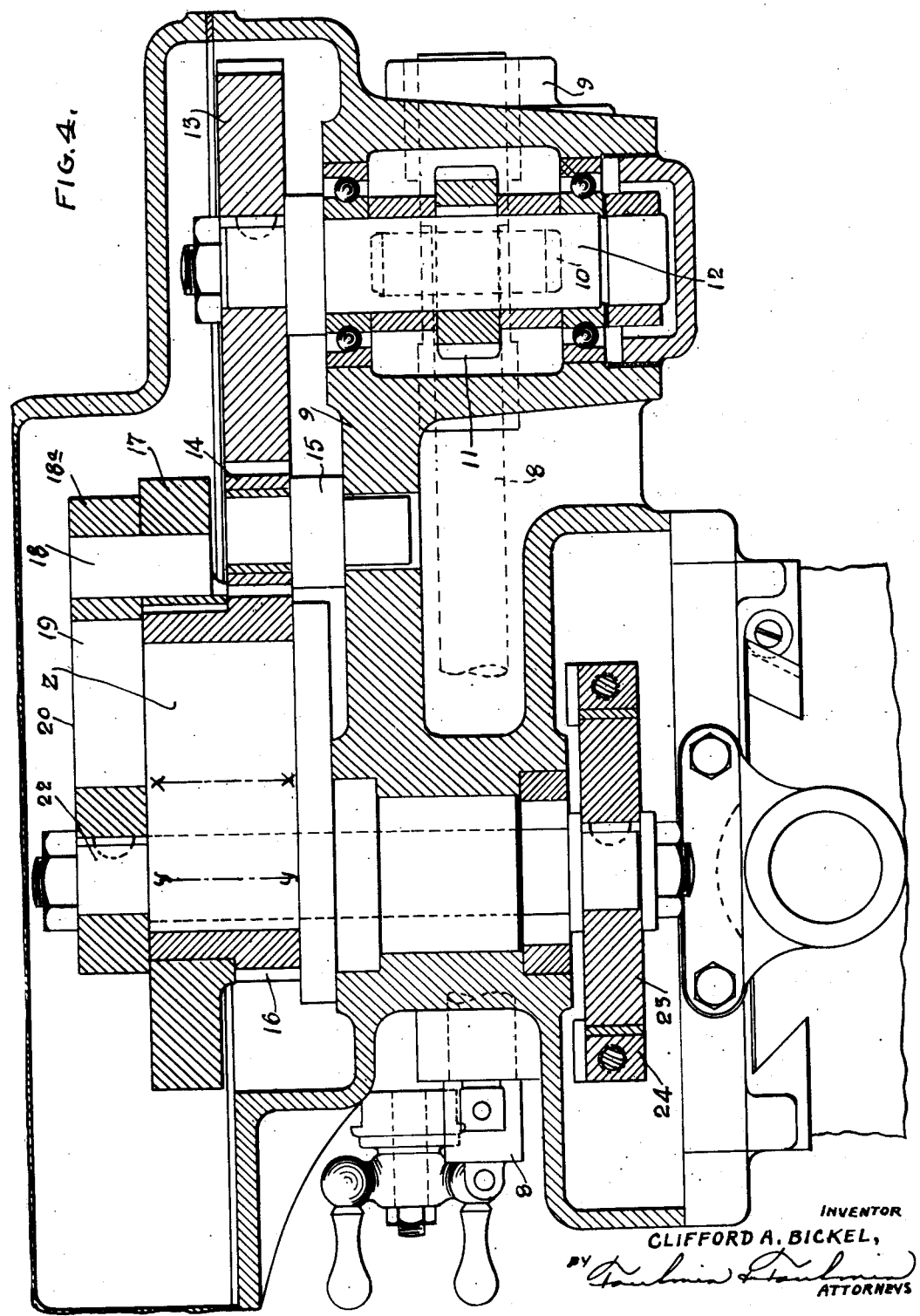

Oct. 17, 1933.  C. A. BICKEL  1,931,157
MACHINE TOOL
Filed March 18, 1932   5 Sheets-Sheet 5

INVENTOR
CLIFFORD A. BICKEL,
BY
ATTORNEYS

Patented Oct. 17, 1933

1,931,157

UNITED STATES PATENT OFFICE 1,931,157

MACHINE TOOL

Clifford A. Bickel, Sidney, Ohio, assignor to The Monarch Machine Tool Company, Sidney, Ohio, a corporation of Ohio Application March 18, 1932. Serial No. 599,752

9 Claims. (Cl. 82—18)

My invention relates to machine tools, and, in particular, to mechanism for moving a cutting tool with respect to a rotating work piece to form multiple sides on a rotating work piece, the tool movements to and from the work piece being adjusted according to the number of faces formed on the work piece which, in turn, is governed by the ratio of in and out tool movement for a given rotation of the work piece.

This invention is an improvement on the apparatus shown in my copending application, Serial No. 599,751, filed March 18, 1932, and deals particularly with one type of mechanism for moving the tool into and out of engagement with the work piece in order to impart the desired number of sides and desired configuration of the sides.

Referring to the drawings:

Figure 4 is a section on the line 4—4 of Figure 1;

Figure 5 is a diagram showing the layout of the movement of the parts;

Figure 1:
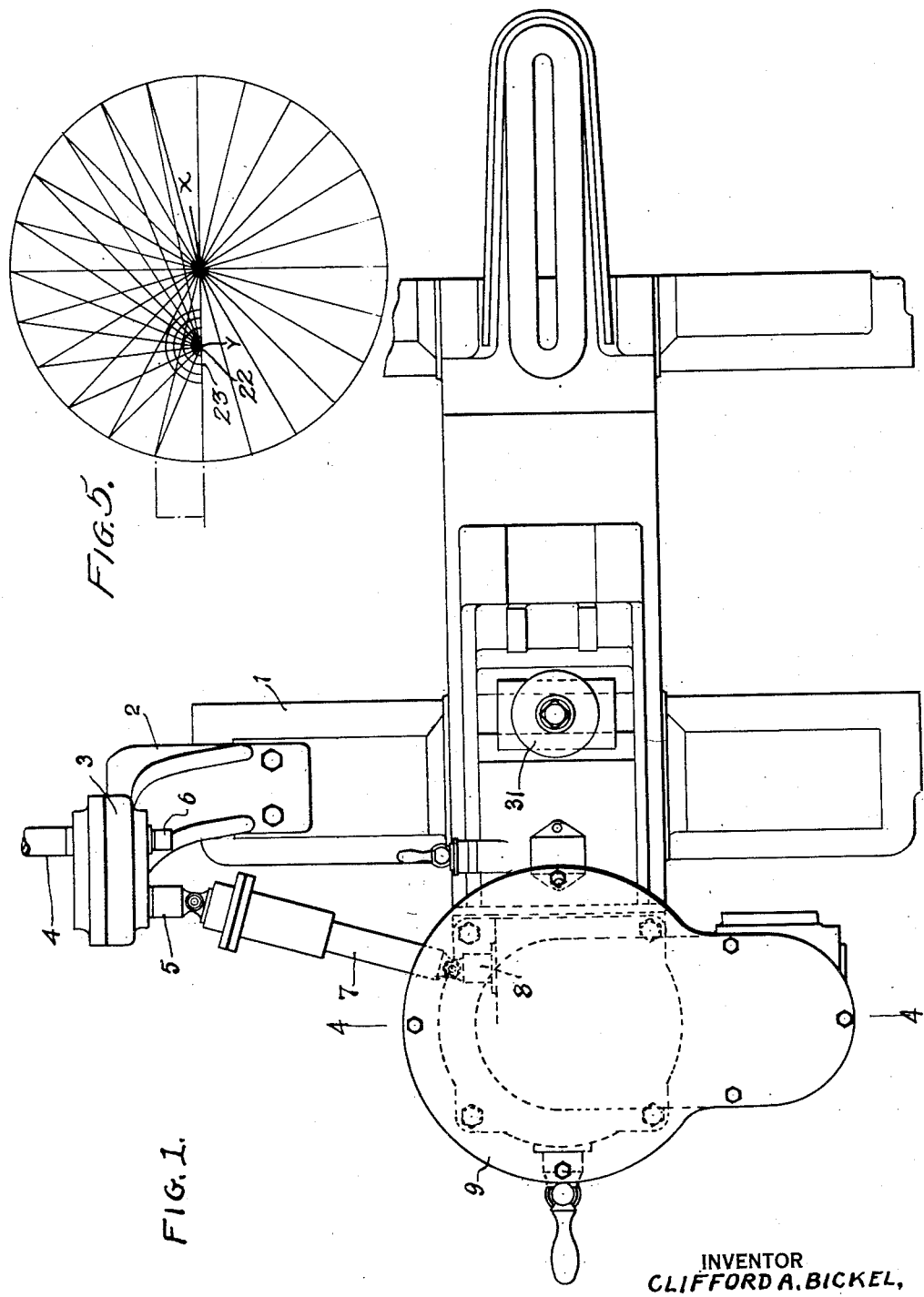
Figure 1 is a top plan view of the carriage, cross slide and associated slides for the purpose of adjusting the tool position.
Figure 2:
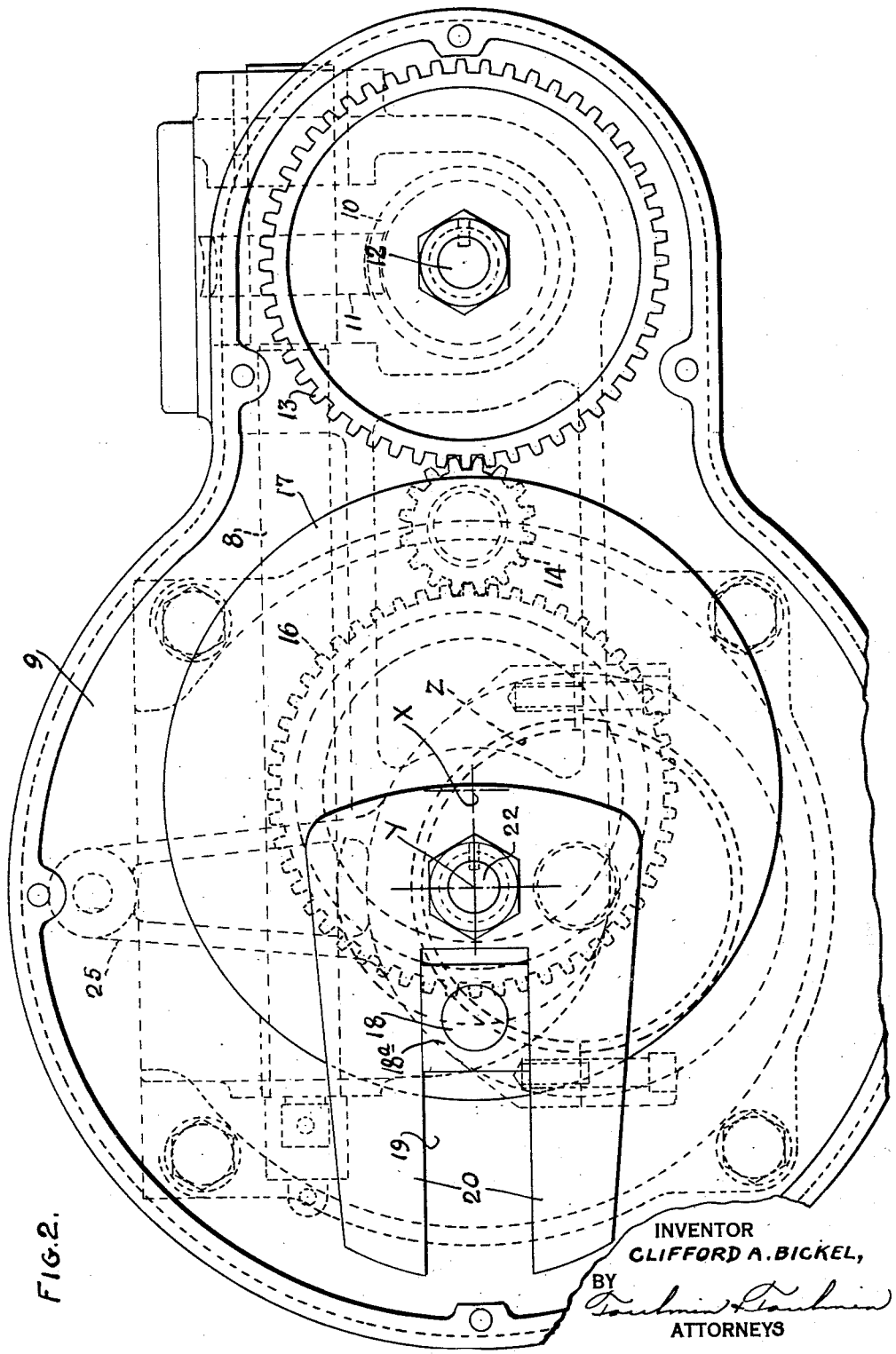
Figure 2 is a top plan view with the cover removed.
Figure 3:
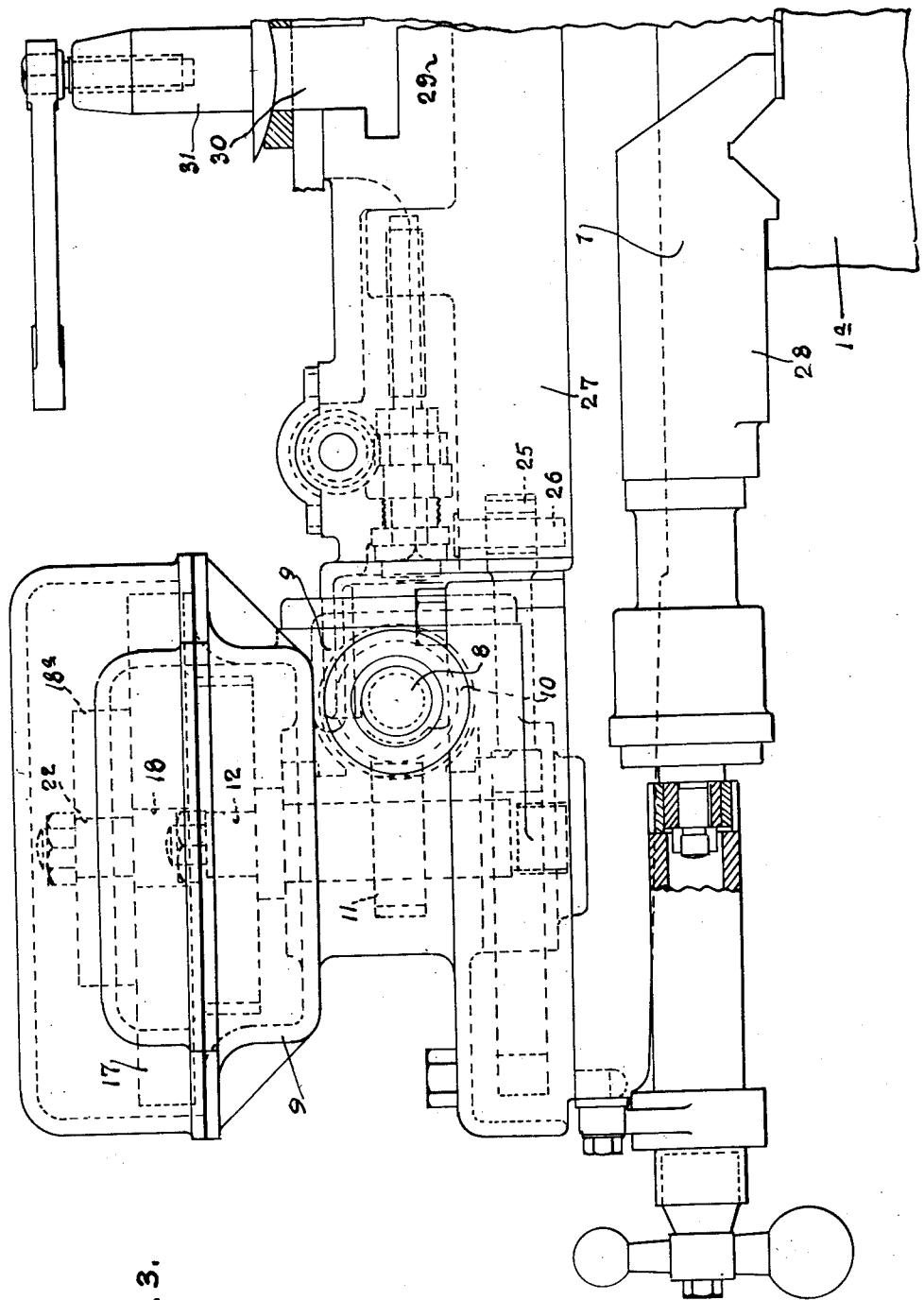
Figure 3 is a side elevation partially in section.
Figure 6:
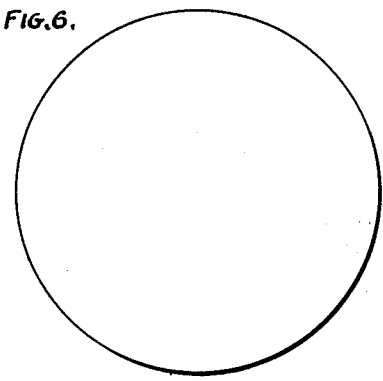
Figure 6 is a section through the circular work piece which is to be formed with multiple sides.
Figure 7:
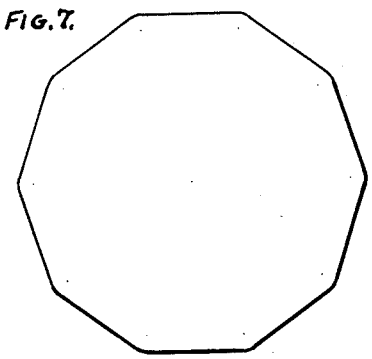
Figure 7 is a section through a work piece so formed having ten sides.
Figure 8:
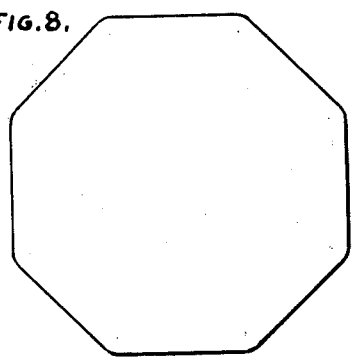
Figure 8 is a diagrammatic illustration of a section through a work piece having eight sides.
Figure 9:
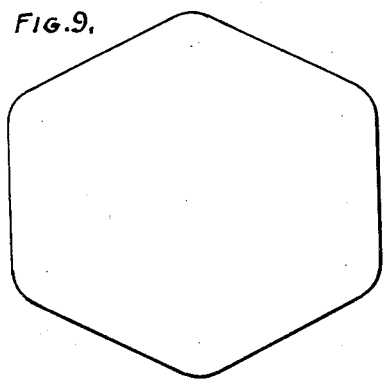
Figure 9 is a diagrammatic illustration of a section through a work piece having six sides.
Figure 10:
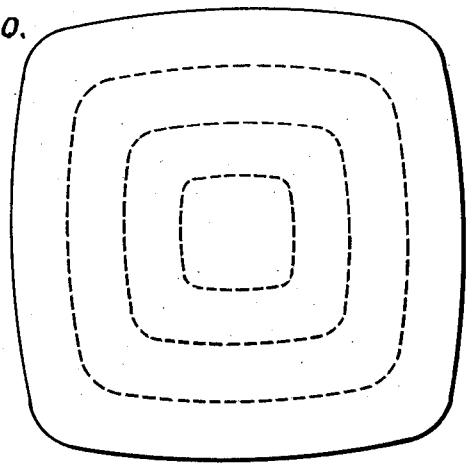
Figure 10 is an end elevation of a work piece having four sides and of progressive diameter.
Figure 11:
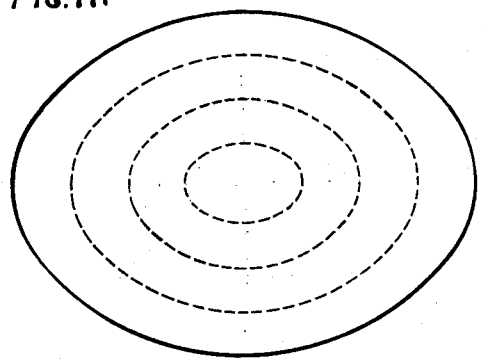
Figure 11 is an oval work piece of progressive diameter.
Figure 12:
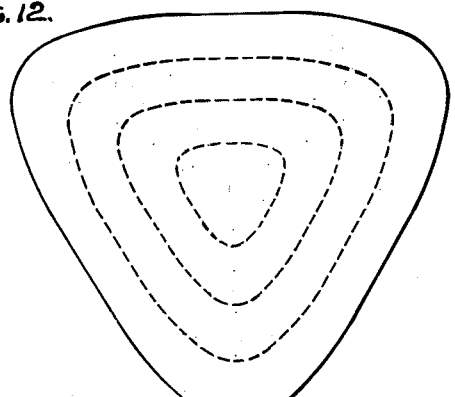
Figure 12 is a triangular work piece of progressive diameter.

Referring to the drawings in detail, 1 indicates a carriage on which is mounted the bracket 2 carrying a gear casing 3. The tool actuating shaft 4 is driven in any suitable manner from the usual head stock in synchronism therewith. The shaft 4 drives through suitable gearing in the casing 3 either the driven shaft 5 or the driven shaft 6, to either of which is connected the shaft 7 that actuates the driven shaft 8. This shaft is mounted in the casing shaft 9. It carries on one end the worm 10 engaging with the worm gear 11 mounted on the shaft 12. On the top of this shaft is mounted a gear 13 engaging a pinion 14 on a stub shaft 15 mounted in the casing 9. The pinion 14 engages with the gear 16 which revolves on the eccentric bush Z which is mounted in the casing 9. On a reduced part of the gear 16 is mounted the drive plate 17 which carries the pin 18 and drives the shoe 18a which reciprocates in the slot 19 formed by the arms 20. These arms are mounted on the bush Z which in turn is mounted on the shaft 22. The bottom of this shaft carries an eccentric cam 23 and a strap 24 mounted thereon which is connected in turn to a connecting rod or pitman 25 which is connected by a pin 26 to an intermediate tool slide 27 mounted on a cross slide 28 which in turn is mounted to move with the carriage 1 on the usual tool bed 1a. The intermediate slide 27 carries the tool slide 29 which in turn carries the tool holder 30 and tool 31. Thus, the distance between the centers YY and XX will determine the extent of the throw or tool movement gradually into and out of the work and the number of such movements in a given cycle of rotation of the work piece, which movement is synchronized with the in and out movements of the tool, will determine the number of sides and the shape of the sides imparted to the work piece.

Referring to Figure 5, it will be noted that the similar centers X and Y are laid out on the diagram, the distance between those centers indicating the length of the tool movement and the outside circle indicating the path of the pin center of the pin 18.

The space between the radius lines indicates the speed of tool movement. The other parts are indicated by similar numerals. It will be noted that the distance between the radius lines drawn from the center 22 on the center Y varies. This is due to the fact that it is necessary to vary the ratio of tool speed during a stroke in order to control the angularity of the side of the work piece. In this case, the tool moves into the work relatively faster and decreases in speed, that is, moves into the work more slowly and thereafter increases in speed.

Speed is a factor in the determination of the contour of a side. The slower the speed of the tool the more nearly the side will approach concavity because the greater the delay in tool movement in withdrawing the tool the deeper the cut, and the faster the tool movement into the work the deeper the cut.

In the present instance, the tool moves slowly, then increases its speed, and then decreases it to a slow termination.

It will be understood that I desire to comprehend within my invention such modifications as may be necessary to adapt it to varying conditions and uses.

Having thus fully described my invention, what I claim as new and desire to secure by Letters Patent, is:

1. In a machine tool, in combination with means for supporting and rotating a workpiece, a carriage, an intermediate slide, a tool mounted thereon, means operatively connected to the work rotating means to reciprocate said tool and slide comprising a driven shaft, gearing driven thereby, a crank pin driven thereby, a second shaft, an arm on said shaft driven by said pin through a pin follower on said arm, an eccentric and pitman associated with the other end of the shaft and connected to the slide.

2. In a machine tool, in combination with means for supporting and rotating a workpiece, a carriage, an intermediate slide, a tool mounted thereon, means operatively connected to the work rotating means to reciprocate said tool and slide comprising a driven shaft, gearing driven thereby, a crank pin driven thereby, a second shaft, an arm on said shaft driven by said pin through a pin follower on said arm, an eccentric and pitman associated with the other end of the shaft and connected to the slide, and means to manually move bodily said intermediate slide, tool and reciprocating mechanism for work-engaging position by the tool.

3. In a machine tool, in combination with means for supporting and rotating a workpiece, a carriage, an intermediate slide, a tool mounted thereon, means operatively connected to the work rotating means to reciprocate said tool and slide comprising a driven shaft, gearing driven thereby, a crank pin driven thereby, a second shaft, an arm on said shaft driven by said pin through a pin follower on said arm, an eccentric and pitman associated with the other end of the shaft and connected to the slide, means to manually move bodily said intermediate slide, tool and reciprocating mechanism for work-engaging position by the tool, and means to move said tool with respect to its slide.

4. In a machine tool, in combination with means for supporting and rotating a workpiece, a carriage, a tool supporting slide movable inwardly and outwardly on said carriage, means operatively connected to the work rotating means to synchronously actuate said slide inwardly and outwardly with its tool and to rotate a work piece, said means comprising a driven shaft, a vertically-disposed intermediate shaft driven thereby by intermediate gearing, a gear mounted on the second shaft, an intermediate pinion and an eccentrically-mounted gear meshing therewith, an eccentric on said eccentrically-mounted gear, a follower mounted on said eccentric, a lever having spaced jaws between which said follower reciprocates, a shaft supporting said lever and supporting said eccentrically-mounted gear, said lever being adapted to rotate with the shaft and to be supported on the gear, an eccentric on the other end of the shaft, a strap and pitman associated therewith connected to said tool supporting slide.

5. In a machine tool, in combination with means for supporting and rotating a workpiece, a carriage, a tool supporting slide operatively connected to the work rotating means movable inwardly and outwardly on said carriage, mechanism for effecting said movement comprising a continuously-rotating driven shaft, a worm drive thereon, a vertically-disposed shaft driven thereby, a second vertically-disposed shaft parallel thereto, an eccentric mounted on the second vertical shaft, a gear mounted thereon, a cam follower engaging the edge of said eccentric, an arm driven by said cam follower mounted on said second vertical shaft, and eccentric means on the bottom of said shaft connected to said tool-carrying slide adapted to reciprocate it.

6. In a machine tool, in combination with means for supporting and rotating a workpiece, a continuously operating driving means operatively connected to the work rotating means, gearing driven thereby, a ring gear driven thereby rotating about a given center, a shaft within said ring gear mounted eccentrically thereof, a lever on said shaft having slotted jaws, a block in said jaws, a pin in said block, and means of moving said pin with said ring gear about the center thereof, an eccentric on the bottom of said shaft, a strap and pitman associated therewith connected to a tool slide to reciprocate said slide.

7. In combination with a work rotating means, a driving shaft operatively connected to said means, gearing driven thereby, an eccentrically mounted ring gear driven thereby, a member mounted thereon traveling therewith, a cam follower, a slotted arm actuated by said cam follower, a shaft supporting said slotted arm, said shaft being placed eccentrically of the center of said ring gear, an eccentric on said shaft, a pitman, a tool slide and tool actuated thereby.

8. In combination with work rotating means, a driving shaft operatively connected to said means, a vertically-disposed driven shaft, a ring gear driven therefrom eccentrically mounted on a stationary eccentric, a stationary eccentric supporting member, a vertically-disposed shaft supported thereby, a pin on said eccentrically-mounted ring gear, a follower associated therewith, means on said follower reciprocally engaging a slotted arm on said last mentioned shaft, a slotted arm thereon, an eccentric on said shaft, an eccentric strap and pitman, a tool slide and tool connected therewith.

9. In a machine tool, in combination with work rotating means, a horizontally-disposed continuously-rotating driving shaft operatively connected to said means, a vertically-disposed shaft driven thereby, a gear thereon, a pinion driven thereby, a pinion supporting shaft, a ring gear driven by said pinion, an eccentric stationary support for said ring gear, a pin on said ring gear, a slotted arm, a follower engaging said pin and engageable with said slotted arm, a shaft mounted in said stationary eccentric support carried in said arm, an eccentric cam mounted on said shaft, a pitman actuated thereby, a tool slide and tool.

CLIFFORD A. BICKEL.